United States Patent
Song et al.

(10) Patent No.: US 6,742,018 B1
(45) Date of Patent: May 25, 2004

(54) SYSTEM AND METHOD FOR STORING AND RETRIEVING DATA BY KEYWORDS CONVERTED INTO DIVIDED LONG INTEGERS

(75) Inventors: Song Song, Beijing (CN); Leo Y. Liu, Cary, NC (US); Hong Cai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,981

(22) Filed: Jan. 5, 2000

(30) Foreign Application Priority Data

Jan. 8, 1999 (CN) .......................... 99101030 A

(51) Int. Cl.[7] .............................................. G06F 15/16
(52) U.S. Cl. ............................ 709/212; 707/3; 707/101
(58) Field of Search ...................... 709/227, 245–246, 709/212; 455/556–7; 707/3, 1, 2, 101

(56) References Cited

U.S. PATENT DOCUMENTS

| | | | | |
|---|---|---|---|---|
| 5,168,565 A | * | 12/1992 | Morita | 707/3 |
| 5,704,060 A | * | 12/1997 | Del Monte | 707/104.1 |
| 6,101,537 A | * | 8/2000 | Edelstein et al. | 709/219 |
| 6,119,101 A | * | 9/2000 | Peckover | 705/26 |
| 6,430,618 B1 | * | 8/2002 | Karger et al. | 709/225 |
| 6,457,060 B1 | * | 9/2002 | Martin et al. | 709/245 |

FOREIGN PATENT DOCUMENTS

JP  10-063675  *  6/1998  .......... G06F/17/30

OTHER PUBLICATIONS

Wayner, Peter, "Finding Text Fast," Sep. 1993, Byte, p. 128–129.*
Toshiyuki Masui, "Program Development of Personal Digital Assistance Pilot", UNIX Magazine, ASCII, Dec. 1, 1997, vol. 12, pp. 109–114. Mizuo Nishibayashi , "Macintosh", Kyoritsu Shuppan, 1998, 1st Edition, pp. 30–43.
Masaaki Takahashi, "Inside Macintosh", Nikkei Mac, Kikkei BP, May 17, 1994, Vol. 14, pp. 212–219. Tomohiko Uematsu et al, "Comprehension of Reversible Compression Algorithm for Program and Text Data", INTERFACE, Aug. 1, 1992, vol. 183, p. 88–123.

* cited by examiner

*Primary Examiner*—Meng-Al T. An
*Assistant Examiner*—Sindya Narayanaswamy
(74) *Attorney, Agent, or Firm*—A. Bruce Clay; Carstens, Yee & Cahoon, LLP

(57) ABSTRACT

Data is stored in a Palm OS based handheld device. The data includes at least one record which contains a keyword used for identifying the record. Each record is stored as a resource in a resource database in the handheld device. The keyword is converted into a long integer and then divided into two parts. The two parts are stored, respectively, as a resource type and a resource ID in a resource information entry included in a header of the resource database corresponding to the record.

9 Claims, 4 Drawing Sheets

SYSTEM AND METHOD FOR STORING AND RETRIEVING DATA BY KEYWORDS CONVERTED INTO DIVIDED LONG INTEGERS

TECHNICAL FIELD OF THE INVENTION

The present invention relates to a method of storing and retrieving data from handheld devices, and in particular to a method of storing and retrieving data from handheld devices by key word.

BACKGROUND OF THE INVENTION

There are various kinds of handheld devices, from low-end electronic notebooks and cellular phones to high-end palm and handheld computers. PalmPilot by 3COM, as an example of a handheld device, has more than 63% of the worldwide market share of handheld devices. Today, there are more than 10,000 developers on the PalmPilot platform and over 2000 third party manufacturers developing various applications including communications, games, etc.

Although there are many kinds of handheld devices, they have one thing in common, they are small to keep them lightweight. So, the hardware resources for handheld devices are very limited.

Compared with a desktop system, handheld devices have no large capacity storage, such as a magnetic disc. Additionally, there is usually only an internal memory module which is usually less than one megabyte (MB). Although the memory can be expanded using a PCMCIA card, it usually will still only be several more MB, not nearly comparable with magnetic and optical discs, which are widely used in desktop systems.

Due to a requirement for low power consumption, the computing speed of handheld devices is also very limited, and is not nearly comparable with the speed of desktop systems.

Because of the limited memory space on handheld devices, how to store data to save more memory is always a problem worth discussion. Also, because of the limited computing speed on handheld devices, how to rapidly search data stored in them is another problem worth discussion.

The operating system used on handheld devices has to be considered to solve the above problems. There are various operating systems for resource limited handheld devices. Some of them are Palm OS by 3COM, Windows CE by Microsoft, Newton Intelligence by Apple, GEOS by Geoworks, Magic Cap by Magic, PenPoint by Co, etc. The present invention uses Palm OS based handheld devices as an example to discuss and solve the above problems.

WorkPad by IBM and PalmPilot by 3COM are typical products based on Palm OS. Currently, WorkPad has only 1 to 2 MB of memory and the computing speed is limited by its 16 MHZ Motorola 68000 series processor.

In WorkPad, the memory space is divided into ROM and RAM, which are on the same memory module. The capacity of ROM is 0.5 to 1.5 MB. The capacity of RAM is 1 MB minimum. Palm OS main applications are preloaded into ROM. Other applications or substitute applications and system extensions can be loaded into RAM. However, this is not always possible due to the limitation of the RAM capacity. Applications can be upgraded by replacing the ROM. Whole system and applications can be upgraded by installing a new memory module.

Palm OS is designed as a 32 bit system, the address is 32 bits, supports 4 GB address space to store code and data, and works efficiently with little RAM. Palm OS divides the RAM into two virtual parts, dynamic RAM and storage RAM. Dynamic RAM is 32 KB, used as the working space of Palm OS for stack, global variable, and temporary memory. Dynamic RAM is similar to the internal RAM in a desktop system. The other RAM is storage RAM, used to store user data such as is found in Appointments, Todo Lists, MemoPad, and an Address Book. The user data can be WorkPad applications developed by third party developers. The storage RAM is similar to disc storage in a normal desktop system. The memory is powered all the time, even when the handheld device is "turned off" (in low power sleeping mode), and the data in the two RAM areas is preserved. All the memory is protected when the handheld device is reset, but the dynamic RAM may be re-initialized as a part of a booting procedure.

Because the Palm OS device has a limited amount of dynamic memory available and uses nonvolatile RAM instead of disk storage, a traditional file system is not optimal for storing and retrieving user data such as meetings or address book entries.

Traditional file systems work by first reading all or a portion of a file into a memory buffer from disk, using or updating the information in the memory buffer, and then writing the updated information back to disk. Because of the high latency involved in reading or writing to disk, it is not practical to use small memory buffers, and, typically, many kilobytes of data are read from or written to disk at a time.

On the Palm OS device, it makes more sense to access and update data directly in place, because all nonvolatile information on the Palm OS device is stored in memory. This eliminates the extra overhead involved in a file system of transferring the data to and from another memory buffer and also reduces the dynamic memory requirements.

Current database techniques cannot be used on Palm OS based handheld devices without using the file system. For example, in current database techniques, an index file is set up for a keyword and the database is searched using the keyword as an index. But on Palm OS based handheld devices, the records have to be compared with a keyword one by one using a pre-written program. Writing such a program is not only complicated and time consuming, but the searching speed is also very slow due to the large amount of string comparison computing that is necessary.

SUMMARY OF THE INVENTION

The problem solved by the present invention is how to efficiently store and rapidly search data in the limited storage space of Palm OS based handheld devices.

The first object of the present invention is to provide a method of storing data in a Palm OS based handheld device.

The second object of the present invention is to provide a method of retrieving data by keyword from a Palm OS based handheld device.

The third object of the present invention is to provide an apparatus for storing data in a Palm OS based handheld device.

The forth object of the present invention is to provide an apparatus for retrieving data by keyword from a Palm OS based handheld devices.

In order to achieve the first object, the present invention provides a method of storing data into a Palm OS based handheld device, the data including at least one record, each one of the records containing a keyword used for identifying the record, the method characterized by the step of:

storing each record as a resource into a resource database in the handheld device, wherein the keyword contained in each record is converted into a long integer, then divided into two parts, and the two parts are stored respectively as a resource type and a resource ID into a resource information entry included in a header of the resource database, which corresponds to the record.

In order to achieve the second object, the present invention provides a method of retrieving data with a keyword from a Palm OS based hand-held device where the data has been stored by using the method of the present invention, characterized by the steps of:

converting the keyword into a long integer;

dividing the long integer into two parts, respectively, as a resource type and a resource ID, and retrieving a resource which uniquely corresponds to the resource type and the resource ID from a respective resource database by using Palm OS; and obtaining all data in the resource, as retrieved data.

In order to achieve the third object, the present invention provides an apparatus for storing data into a Palm OS based handheld device, the data including at least one record, each one of the records containing a keyword used for identifying the record, the apparatus comprising:

means for converting the keyword contained in the record from a string into a long integer;

means for dividing the long integer into two parts, respectively, as a resource type and a resource ID;

means for forming a new resource by combining the resource type, the resource ID and contents of the record; and means for adding the new resource into a resource database in the handheld device in order to update the database.

In order to achieve the fourth object, the present invention provides an apparatus for retrieving data with a keyword from a Palm OS based handheld device where the data has been stored by using the apparatus of the present invention, characterized by comprising:

means for converting the keyword from a string into a long integer;

means for dividing the long integer into two parts, respectively, as a resource type and a resource ID; and means for retrieving a resource which uniquely corresponds to the resource type and the resource ID from a respective resource database with the Palm OS, and obtaining all data in the resource.

In this invention, when the data containing a keyword is stored, the keyword is converted into a long integer to be used as the resource type and resource ID. Then the functions of the OS itself can be used directly. The space to store the keyword and index can be saved. Furthermore, integer operations are much faster than string operations. Compared with the normal searching method by keywords, the searching method in this invention is much faster.

For more general use, string data can be converted into an integer before it is stored to save storage space. If n is the number of the kinds of characters in the string data to be stored, this invention can save the space of $(1-\log(n)/\log(256)) \times 100\%$. Another advantage is the data being stored has some kind of encryption, which is not easy to read in the normal way.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
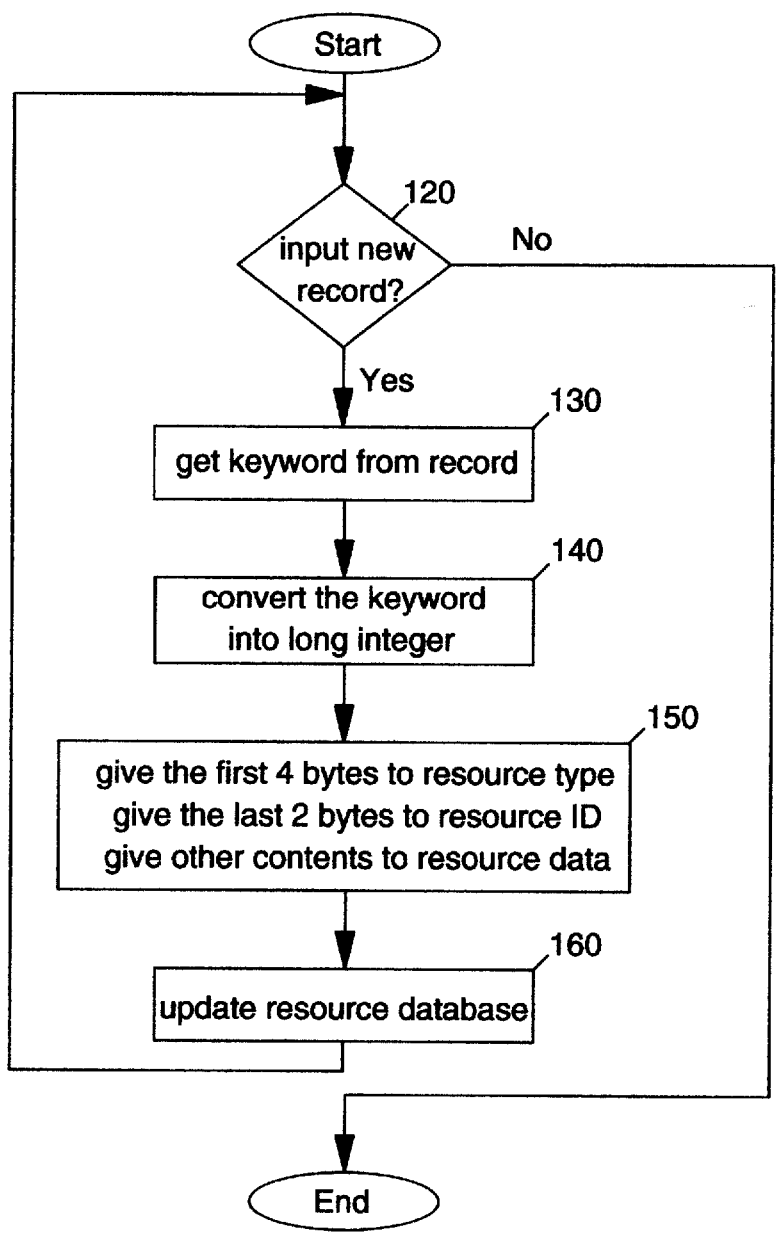
FIG. 1 is a flow chart illustrating a first embodiment of the present invention for storing data on Palm OS based handheld devices.

To understand the methods and devices in this invention better, the data storage and management in a Palm Os environment is introduced first. In the Palm OS environment, all data is stored in memory as chunks. Palm OS provides a set of resource management programs, which can be used to get and store data conveniently. Each data block has a local ID which is a card-relative reference to a data chunk and remains valid no matter which slot on the handheld device the card is in. Once the base address of the card is determined at runtime, a local ID can be quickly converted to a real pointer or handle.

Each chunk can be tagged with a unique resource type and a unique resource ID. These tagged data chunks, called resources, are stored in resource databases. Resources are typically used to store the application's user interface elements, such as images, fonts, or dialog layouts. In the Palm OS environment, an application is, in fact, simply a resource database with the executable code stored as one or more code resources with the graphics elements and other miscellaneous data stored in the same database as other resource types.

For any resource, the resource type and the resource ID are saved in a header of the resource database. The resource data is saved in the memory chunks. The resource database header includes some general database information followed by a resource table. The resource table includes some resource information table items. Every resource information item in the table is 10 bytes long including the resource type (4 bytes), resource ID (2 bytes) and a local ID of memory chunks which save the resource data.

Because the resource type and the resource ID of a particular resource are unique, any resource can be located by its resource type and resource ID. There are several APIs in Palm OS that can be used to manage the resource database. One of the APIs is DmGetResource. Given the resource type and the resource ID as input parameters, it can return a pointer that points to the specified resource data. As a result of this feature, it was discovered that when storing some data that can be identified by keywords in memory, the keyword can be split into two parts: resource type and resource ID, respectively, and store them in the header of the resource database. At the same time the related data can be stored in the same resource database as a resource. By doing so, the speed of access to the data can be greatly improved using the embedded feature of quick accessing resource data in Palm OS.

However, this brings about a problem of uniqueness if the keyword is simply split into two part as resource type and resource ID. Because in this way, the keyword that can be represented (only 6 bytes) will be very limited. It's apt to be confused with the system resource types like "CODE" and "ADDR" etc. So some kind of transformation is needed to transform the keywords into a 4 byte part and a 2 byte part. The transformation should ensure that the value of the combination of these two parts is unique.

In typical prior art storing methods each character is stored as 8 bits of ASCII code. For example, in the case of storing alphanumeric characters, up to 30 percent of space can be saved if only 5–6 bits is used. However, this kind of transformation may increase the computation of Palm OS.

In the present invention, a compromise method is used: the character data will be transformed into an integer in the radix of N where N is the kind of character used in the character set.

For better understanding, the following example is provided for a character set that only includes 26 alphabetic characters and a space character, and thus, N equals 27. In the first step, each character will be transformed into the corresponding integer in table A and the space transformed into 0:

TABLE A

| letter | a | b | c | d | e | f | g |
|--------|---|---|---|---|---|---|---|
| integer | 1 | 2 | 3 | 4 | 5 | 6 | 7 |
| letter | h | I | j | k | l | m | n |
| integer | 8 | 9 | 10 | 11 | 12 | 13 | 14 |
| letter | o | p | q | r | s | t | |
| integer | 15 | 16 | 17 | 18 | 19 | 20 | |
| letter | u | v | w | x | y | z | |
| integer | 21 | 22 | 23 | 24 | 25 | 26 | |

In the second step, each integer will be multiplied by the corresponding exponential of 27. The order of the exponential relates to the position of the characters in the string. In the third step, all the multiplication will be summed and an integer in the radix of 27 will be obtained.

To summarize the above transformation:

Suppose a keyword is "accelerate". First transform the 10 characters into 10 integers (refer to table 1):

| a | c | c | e | l | e | r | a | t | e |
|---|---|---|---|---|---|---|---|---|---|
| 1 | 3 | 3 | 5 | 12 | 5 | 18 | 1 | 20 | 5 |

Then multiple each of these integers with the exponential of 27 with an order decided by the position in the keyword from left to right (0 to 9). So there are 10 multiplications:

$1*27^0$ $3*27^1$ $3*27^2$ $5*27^3$ $12*27^4$ $5*27^5$ $8*27^6$ $1*27^7$ $20*27^8$ $5*27^9$

Finally, sum up all the 10 multiplications and get an integer in the radix of 27: 43,794,090,299,071. The integer is a long integer. In handheld devices, it can be stored in only 6 bytes. However, when using the normal method "accelerate" must be stored using 10 bytes. Thus, up to 4 bytes can be saved.

Extending the above idea to more general conditions, a keyword B can be represented with an integer m in the radix of N through the following equations:

$$m = \sum_{l=1}^{L} [bi - a(bi)] \times N^{s(l)-1}$$

wherein,

L is the length of keyword B,

N is the number of components in the transformation table A, bi is the ASCII value of the I th character in keyword B, a(bi) is the corresponding transformed value in transform table A.

The value of s(I) relates to the coding sequence of the character in the keyword, for example:

(1) Coding from left to right, s(1), . . . , s(L) will take the value of 1, . . . , L;

(2) Coding from right to left, s(1), . . . , s(L) will take the value of L, . . . , 1;

(3) First coding the characters at the odd position and then coding the characters in the even position, then s (1), . . . , s(L) will take the value of 1,1+L/2,2,2+L/2, . . . , L/2, L.

The above mentioned three coding methods are only examples to help understand the algorithm used in the present invention. In a real environment, any one of the above three methods or any other methods (other coding sequence) can be used.

For keyword "accelerate", L=10, b(1), . . . , b(L) correspond to a,c,c,e,l,e,r,a,t,e. s(1), . . . , s(10) corresponding to the above three methods are:

(1) 1,2, . . . , 10

(2) 10,9, . . . , 1

(3) 1,6,2,7, . . . , 5,10

When we the English words are transformed, take the order from right (end) to left (begin) and select the 10 characters as keyword B. Then the keyword will be different for different English words even if the length of the word exceeds 10 characters. So each word can be uniquely identified.

Following the above transformation method, the invention of storing data in Palm OS devices can be easily implemented. Here the data includes at least one record, and each record has a unique keyword that can be used to identify itself. The storing method comprises the following steps:

Store each record into one resource database of a handheld device as a resource; and Transform the keyword of each record into a long integer, divide the long integer into two parts and use them as resource type and resource ID in one of the items of the header of the resource database, respectively.

In the above method, only the content of each record, excluding the keyword can be stored. Thus, a lot of memory can be saved.

No coding detail is given here, because the program can be easily coded without creative work. For example, a new resource database can be created in the Palm OS based device. Then the records of data are processed sequentially, keywords are transformed into long integers, then into resource type and resource ID. Then, make the contents of the data resource data. After that the resource can be added to the resource database through the APIs provided by Palm OS.

FIG. 1 illustrates a flow chart of a first embodiment implementing the storing method of the present invention. In step 120, it is determined if there is a new data record to be stored in the handheld device. If not, the process ends. If yes, the present invention goes to step 130. In step 130, a keyword will be extracted from the record. In step 140, the keyword will be transformed into a 6 byte long integer. In step 150, the contents of data are filled into a resource record, using the first 4 bytes of the long integer as resource type, using the last 2 bytes of long integer as resource ID and using the data indexed by the keyword as resource data. In step 160, the new resource is added to the resource database. Then the present invention returns to step 120.

The above steps are implemented directly in the Palm devices. In another more convenient way, a resource database template can be constructed using the desktop's develop tools in accordance with the specification of Palm OS resource databases. Then keywords and contents of the data are filled into the resource database with the method described in this invention. At last, through HotSync, this resource database can be transferred into Palm devices.

HotSync is a way of synchronizing the data between a desktop computer and a Palm OS device. The modification in the Palm device can be synchronized in the corresponding component of the desktop and vice versa. The HotSync method is integrated into handheld linkage function with a desktop. A cradle is used to communicate between the handheld device and the desktop PC. Through one-touch HotSync, the backup of handheld data and synchronization between the handheld device and the desktop can be easily implemented.

Figure 2:
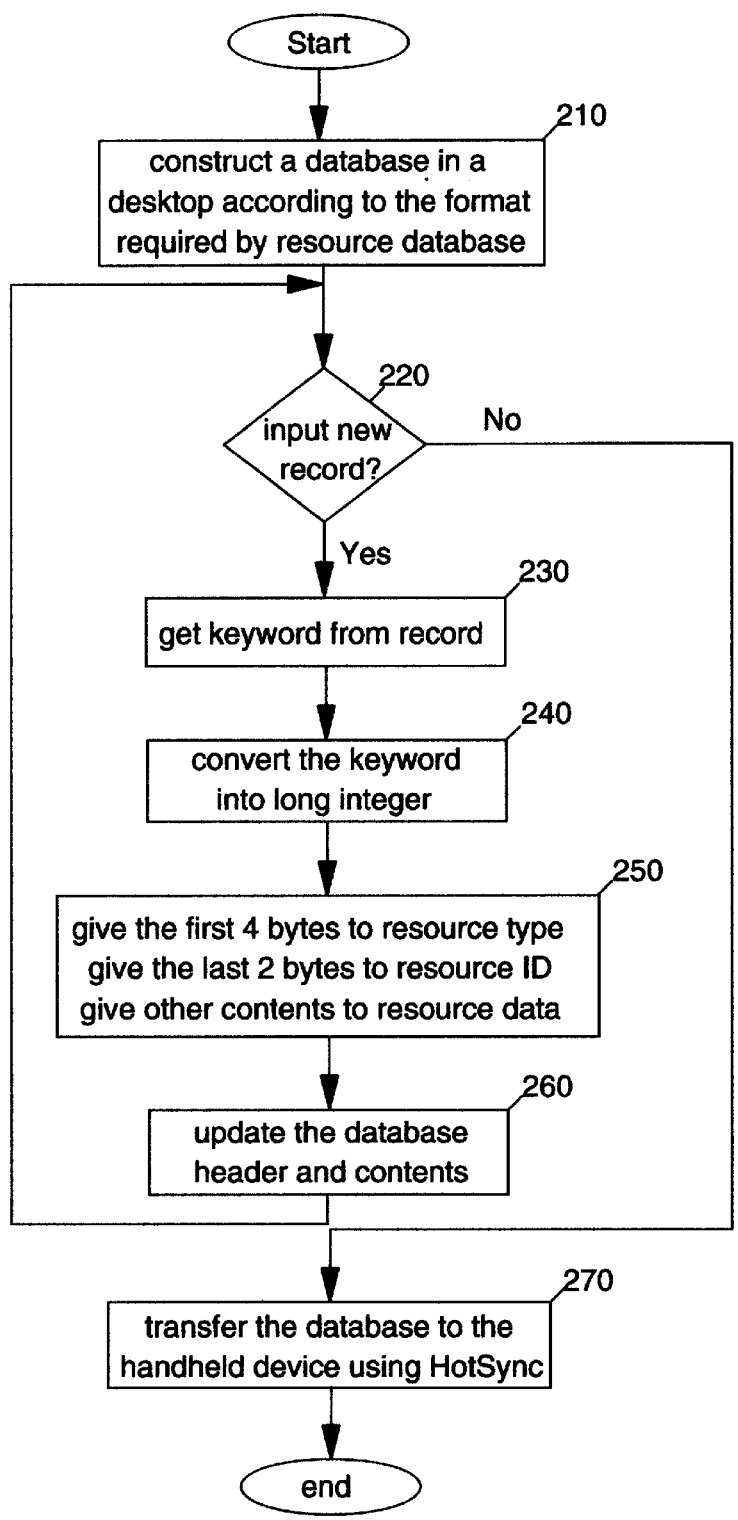
FIG. 2 is a flow chart illustrating a second embodiment of the present invention for storing data on Palm OS based handheld devices.

FIG. 2 illustrates a flowchart of a second embodiment implementing the storing method of the present invention. In step 210, on a desktop a resource database template is constructed based on a format required by Palm OS. In step 220, it is judged whether or not a new record will be added to the handheld device. If not, the process will go to 270, otherwise it will go to 230. In step 230, a keyword is extracted from data. In step 240, a keyword is transformed into a 6 byte long integer. In step 250, the contents of data are VoidHand DmGetResource (ULong type, Int ID)

Here "type" refers to resource type and "ID" refers to resource ID. A pointer to the resource data will be returned if successful.

Figure 3:
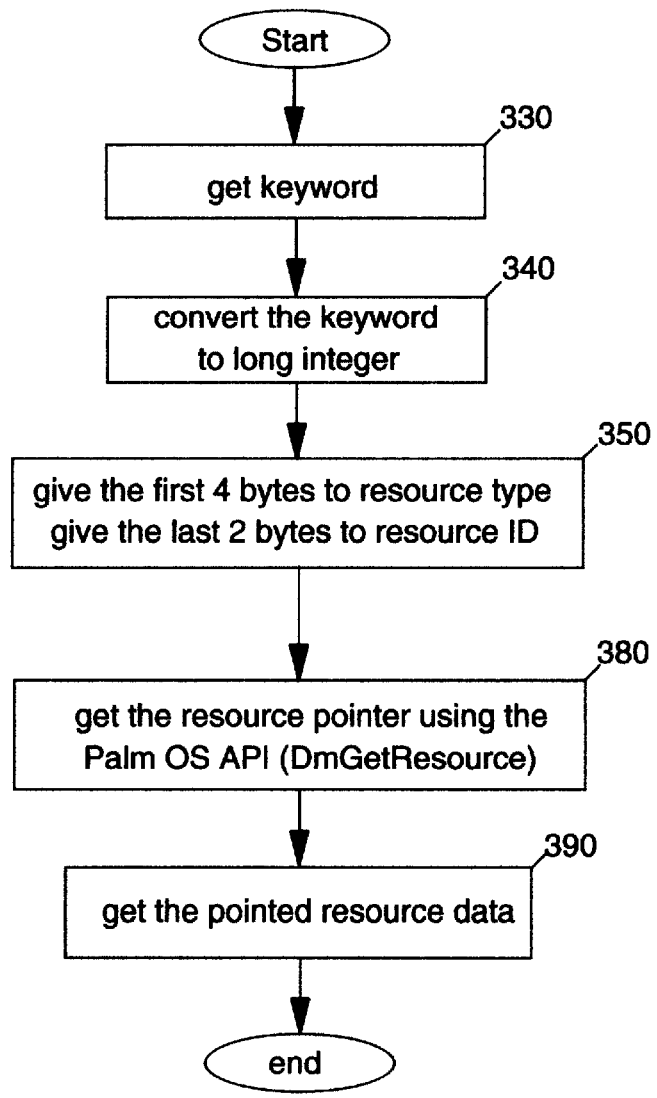
FIG. 3 is a flow chart for illustrating a search of data according to the present invention by a keyword on Palm OS based handheld devices.

FIG. 3 shows the kernel flow chart of retrieving data from a Palm OS device. In step 330, a keyword is obtained. In step 340, the keyword will be converted into a 6 byte integer. In step 350, the first four bytes of this integer is assigned to the resource type and the last two bytes will be assigned to the resource ID. In step 380, by using a Palm OS API a resource pointer corresponding to the resource type and the resource ID is obtained. In step 390 a pointer to the memory block with resource data is returned, if not empty.

The above mentioned data storage and retrieval method can be widely used. It can be used any place where a keyword is used to index the stored items, e.g. in various dictionaries, in address books, in expense books, etc. The method can also be used in automatic spell checking and modification.

Figure 4:
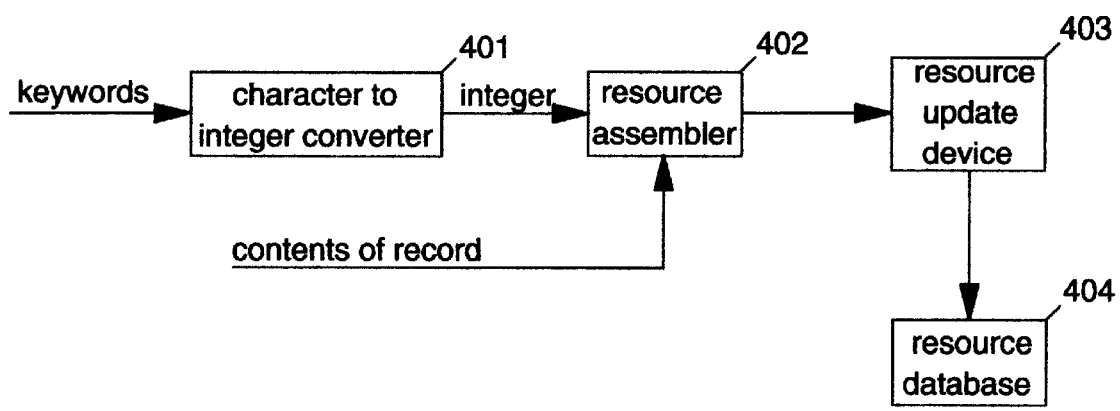
FIG. 4 is a block diagram illustrating an apparatus for storing data on Palm OS based handheld devices according to the present invention.

FIG. 4 shows the apparatus for storing data on a Palm OS based handheld device according to this invention. The apparatus includes a character to integer converter 401, a resource assembler 402 and a resource database update device 403. Reference numeral 404 denotes a resource database in a Palm OS device. In operation, character to integer converter 401 converts a keyword into a long integer and outputs the long integer to resource assembler 402. Then the long integer is divided by the resource assembler 402 into two parts as filled into a resource record, using the first 4 bytes of the long integer as resource type and the last 2 bytes of long integer as resource ID and using the data that indexed by the keyword as resource data. In step 260, the new resource is added to the resource database. Then the present invention will go back to step 220. In step 270, the database will be transferred into a Palm device through HotSync (or other ways).

The present invention also provides a data retrieval method that corresponds with the data storage method mentioned above. This is a method that retrieves data from Palm OS devices using keywords. The data is stored in a handheld device using the storage method of this invention.

The retrieval method comprises the following steps:
converting the keywords into a long integer;
dividing the integer into two parts and using them as resource type and resource ID, respectively; and
getting the resource from a resource database that uniquely corresponds to the resource type and resource ID combination in the database.

For example, a keyword can be converted into an integer and split into two parts, giving the values to resource type and resource ID. Then the corresponding resource can be obtained from a database using the following API:
a resource type and a resource ID, respectively, and assembled into a new resource with the contents of the record. Finally, the resource update device 403 uses the system API to add the new resource into resource database 404.

Figure 5:
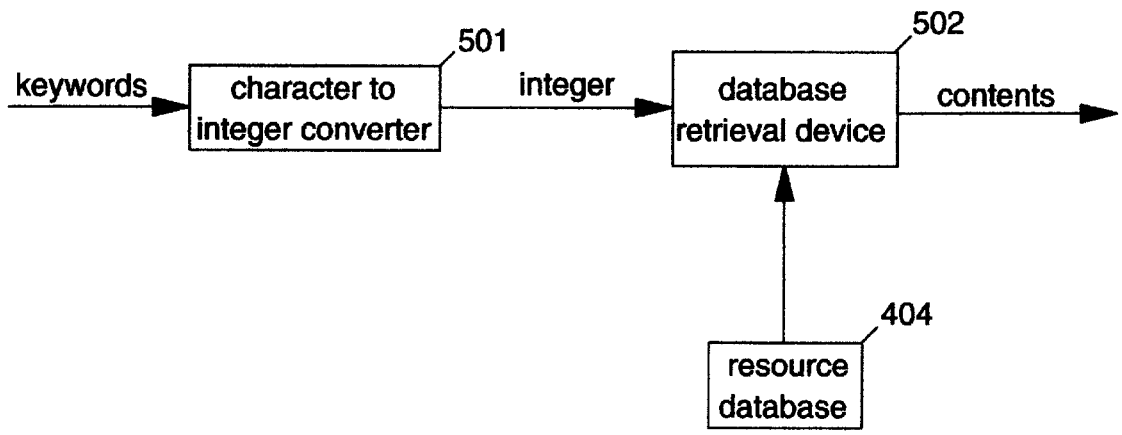
FIG. 5 is a block diagram of an apparatus for retrieving data by a keyword on Palm OS based handheld devices according to the present invention.

FIG. 5 shows the apparatus for retrieving data from a Palm OS handheld device. It includes a character to integer converter 501 and a resource database retrieval device 502. Numeral 404 denotes a resource database in a handheld device, as previously shown in FIG. 4. In operation, the character to integer converter 501 converts an input keyword into a long integer, and then inputs the long integer into the database retrieval device 502. The long integer is divided by the database retrieval device 502 into a resource type and a resource ID, and finally a unique resource block is fetched from the resource database 404 using the resource type and resource ID combination.

While the preferred embodiments of the present invention have been described in detail with reference to the drawings, various amendments and changes can be made by persons skilled in the art, without departing from the scope and spirit of the present invention. Thus, the scope of the present invention is limited only by the appended claims.

What is claimed is:

1. A method of storing data in a Palm OS based handheld device, the data including at least one record which contains a keyword used for identifying the at least one record, comprising the steps of:
    storing the at least one record as a resource in a resource database in the handheld device;
    converting the keyword contained in the at least one record into a long integer;
    dividing said integer into two parts; and
    storing said two parts as a resource type and a resource ID into a resource information entry included in a header of said resource database of the at least record.

2. The method of claim 1, wherein only contents other than the keyword contained in the least one record are stored as a resource.

3. The method of claim 1, wherein said long integer is an N-based integer, wherein N is a constant equal to a total number of different characters concerned in the keywords of all the at least one record.

4. The method of claim 1, further comprising the step of:
retrieving all data in said resource which uniquely corresponds to said resource type and said resource ID from a respective resource database as retrieved data.

5. The method of claim 4, wherein said step of converting said keyword into a long integer converts said keyword into an N-based integer, wherein N equals a constant used when the data is stored into the handheld device.

6. An apparatus for storing data in a Palm OS based handheld device, the data including at least one record, each of the at least one record containing a keyword used for identifying the at least one record, comprising:
means for converting the keyword contained in the at least one record from a string into a long integer;
means for dividing said long integer into two parts, respectively, as a resource type and a resource ID, and forming a new resource by combining said resource type, said resource ID and contents of the at least one record; and
resource database updating means for adding said new resource into a resource database in the handheld device.

7. The apparatus of claim 6, further comprising:
resource database retrieving means for retrieving all data in a resource which uniquely corresponds to said resource type and said resource ID from a respective resource database.

8. A computer program product recorded on computer readable medium for storing data in a Palm OS based handheld device, the data including at least one record, each of the at least one record containing a keyword used for identifying the at least one record, comprising:
A computer readable means for converting the keyword contained in the at least one record from a string into a long integer;
computer readable means for dividing said long integer into two parts, respectively, as a resource type and a resource ID, and forming a new resource by combining said resource type, said resource ID and contents of the at least one record; and
computer readable resource database updating means for adding said new resource into a resource database in the handheld device.

9. A method of storing data, the data including at least one record which contains a keyword used for identifying the at least one record, comprising the steps of:
storing the at least one record as a resource in a resource database;
converting the keyword contained in the at least one record into a long integer;
dividing said integer into two parts; and
storing said two parts as a resource type and a resource ID into a resource information entry included in a header of said resource database of the at least record.

* * * * *